United States Patent
Oehring et al.

(10) Patent No.: US 10,526,882 B2
(45) Date of Patent: Jan. 7, 2020

(54) MODULAR REMOTE POWER GENERATION AND TRANSMISSION FOR HYDRAULIC FRACTURING SYSTEM

(71) Applicant: US Well Services LLC, Houston, TX (US)

(72) Inventors: Jared Oehring, Houston, TX (US); Brandon Neil Hinderliter, Buckhannon, WV (US)

(73) Assignee: U.S. Well Services, LLC, Houston, TX (US)

( * ) Notice: Subject to any disclaimer, the term of this patent is extended or adjusted under 35 U.S.C. 154(b) by 57 days.

(21) Appl. No.: 15/183,387

(22) Filed: Jun. 15, 2016

(65) Prior Publication Data

US 2016/0290114 A1 Oct. 6, 2016

Related U.S. Application Data

(63) Continuation-in-part of application No. 13/679,689, filed on Nov. 16, 2012, now Pat. No. 9,410,410.

(60) Provisional application No. 62/180,289, filed on Jun. 16, 2015.

(51) Int. Cl.
| | |
|---|---|
| *E21B 43/26* | (2006.01) |
| *H02P 29/02* | (2016.01) |
| *E21B 43/267* | (2006.01) |

(52) U.S. Cl.
CPC .............. *E21B 43/26* (2013.01); *H02P 29/02* (2013.01); *E21B 43/267* (2013.01)

(58) Field of Classification Search
CPC ..................................................... E21B 43/26
See application file for complete search history.

(56) References Cited

U.S. PATENT DOCUMENTS

| | | | |
|---|---|---|---|
| 1,671,436 A | 5/1928 | Melott | |
| 2,004,077 A | 6/1935 | McCartney | |
| 2,183,364 A | 12/1939 | Bailey | |
| 2,220,622 A | 11/1940 | Aitken | |
| (Continued) | | | |

FOREIGN PATENT DOCUMENTS

| | | |
|---|---|---|
| AU | 2007340913 | 7/2008 |
| CA | 2955706 | 10/2012 |
| (Continued) | | |

OTHER PUBLICATIONS

Non-Final Office Action issued in corresponding U.S. Appl. No. 15/486,970 dated Jun. 22, 2017.

(Continued)

*Primary Examiner* — Kenneth L Thompson
(74) *Attorney, Agent, or Firm* — Hogan Lovells US LLP

(57) ABSTRACT

A hydraulic fracturing system for fracturing a subterranean formation includes a power generation system, a transmission section, and an equipment load section. The power generation system includes a turbine generator that generates electricity that is used to power equipment in the equipment load section. The equipment in the equipment load section conditions and pressurizes fluid that is injected into a wellbore for fracturing the formation. The power generation and equipment load sections are distal from one another are separated by a long distance. The transmission section connects the power generation and equipment load sections, and thus spans the long distance between these sections.

14 Claims, 4 Drawing Sheets

(56) References Cited

U.S. PATENT DOCUMENTS

| | | | |
|---|---|---|---|
| 2,248,051 A | 7/1941 | Armstrong | |
| 2,753,940 A | 7/1956 | Bonner | |
| 3,061,039 A | 10/1962 | Peters | |
| 3,066,503 A | 12/1962 | Fleming | |
| 3,334,495 A | 8/1967 | Jensen | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,881,551 A | 5/1975 | Terry | |
| 4,037,431 A | 7/1977 | Sugimoto | |
| 4,100,822 A | 7/1978 | Rosman | |
| 4,151,575 A | 4/1979 | Hogue | |
| 4,226,299 A | 10/1980 | Hansen | |
| 4,265,266 A | 5/1981 | Kierbow et al. | |
| 4,432,064 A | 2/1984 | Barker | |
| 4,442,665 A | 4/1984 | Fick et al. | |
| 4,456,092 A | 6/1984 | Kubozuka | |
| 4,506,982 A | 3/1985 | Smithers et al. | |
| 4,512,387 A | 4/1985 | Rodriguez | |
| 4,529,887 A | 7/1985 | Johnson | |
| 4,538,916 A | 9/1985 | Zimmerman | |
| 4,676,063 A | 6/1987 | Goebel et al. | |
| 4,793,386 A | 12/1988 | Sloan | |
| 4,845,981 A | 7/1989 | Pearson | |
| 4,922,463 A | 5/1990 | Del Zotto et al. | |
| 5,006,044 A | 4/1991 | Walker, Sr. | |
| 5,025,861 A | 6/1991 | Huber et al. | |
| 5,130,628 A | 7/1992 | Owen | |
| 5,131,472 A | 7/1992 | Dees et al. | |
| 5,172,009 A | 12/1992 | Mohan | |
| 5,189,388 A | 2/1993 | Mosley | |
| 5,422,550 A | 6/1995 | McClanahan | |
| 5,548,093 A | 8/1996 | Sato | |
| 5,590,976 A | 1/1997 | Kilheffer et al. | |
| 5,655,361 A | 8/1997 | Kishi | |
| 5,736,838 A | 4/1998 | Dove et al. | |
| 5,755,096 A | 5/1998 | Holleyman | |
| 5,790,972 A | 8/1998 | Kohlenberger | |
| 5,865,247 A | 2/1999 | Paterson | |
| 5,879,137 A | 3/1999 | Yie | |
| 5,894,888 A | 4/1999 | Wiemers | |
| 5,907,970 A | 6/1999 | Havlovick et al. | |
| 6,138,764 A | 10/2000 | Scarsdale et al. | |
| 6,142,878 A | 11/2000 | Barin | |
| 6,164,910 A | 12/2000 | Mayleben | |
| 6,202,702 B1 | 3/2001 | Ohira | |
| 6,208,098 B1 * | 3/2001 | Kume | H02M 1/126 318/400.25 |
| 6,254,462 B1 | 7/2001 | Kelton | |
| 6,271,637 B1 | 8/2001 | Kushion | |
| 6,315,523 B1 | 11/2001 | Mills | |
| 6,477,852 B2 | 11/2002 | Dodo | |
| 6,484,490 B1 | 11/2002 | Olsen | |
| 6,491,098 B1 | 12/2002 | Dallas | |
| 6,529,135 B1 | 3/2003 | Bowers et al. | |
| 6,776,227 B2 | 8/2004 | Beida | |
| 6,802,690 B2 | 10/2004 | Han | |
| 6,808,303 B2 | 10/2004 | Fisher | |
| 6,931,310 B2 | 8/2005 | Shimizu et al. | |
| 7,104,233 B2 | 9/2006 | Ryczek et al. | |
| 7,170,262 B2 | 1/2007 | Pettigrew | |
| 7,173,399 B2 | 2/2007 | Sihler | |
| 7,312,593 B1 | 12/2007 | Streicher et al. | |
| 7,336,514 B2 | 2/2008 | Amarillas | |
| 7,445,041 B2 | 11/2008 | O'Brien | |
| 7,494,263 B2 | 2/2009 | Dykstra et al. | |
| 7,500,642 B2 | 3/2009 | Cunningham | |
| 7,525,264 B2 | 4/2009 | Dodge | |
| 7,563,076 B2 | 7/2009 | Brunet | |
| 7,581,379 B2 | 9/2009 | Yoshida | |
| 7,675,189 B2 | 3/2010 | Grenier | |
| 7,683,499 B2 | 3/2010 | Saucier | |
| 7,717,193 B2 | 5/2010 | Egilsson et al. | |
| 7,755,310 B2 | 7/2010 | West et al. | |
| 7,807,048 B2 | 10/2010 | Collette | |
| 7,845,413 B2 | 12/2010 | Shampine | |
| 7,977,824 B2 | 7/2011 | Halen et al. | |
| 8,037,936 B2 | 10/2011 | Neuroth et al. | |
| 8,054,084 B2 | 11/2011 | Schulz et al. | |
| 8,083,504 B2 | 12/2011 | Williams | |
| 8,096,891 B2 | 1/2012 | Lochtefeld | |
| 8,139,383 B2 * | 3/2012 | Efraimsson | H02J 3/00 361/107 |
| 8,146,665 B2 | 4/2012 | Neal | |
| 8,154,419 B2 | 4/2012 | Daussin et al. | |
| 8,232,892 B2 | 7/2012 | Overholt et al. | |
| 8,261,528 B2 | 9/2012 | Chillar | |
| 8,272,439 B2 | 9/2012 | Strickland | |
| 8,310,272 B2 | 11/2012 | Quarto | |
| 8,354,817 B2 | 1/2013 | Yeh et al. | |
| 8,474,521 B2 | 7/2013 | Kajaria | |
| 8,534,235 B2 | 9/2013 | Chandler | |
| 8,573,303 B2 | 11/2013 | Kerfoot | |
| 8,596,056 B2 | 12/2013 | Woodmansee | |
| 8,616,005 B1 | 12/2013 | Cousino | |
| 8,616,274 B2 | 12/2013 | Belcher et al. | |
| 8,692,408 B2 | 4/2014 | Zhang et al. | |
| 8,727,068 B2 | 5/2014 | Bruin | |
| 8,760,657 B2 | 6/2014 | Pope | |
| 8,774,972 B2 | 7/2014 | Rusnak et al. | |
| 8,789,601 B2 | 7/2014 | Broussard | |
| 8,807,960 B2 | 8/2014 | Stephenson | |
| 8,838,341 B2 | 9/2014 | Kumano | |
| 8,851,860 B1 | 10/2014 | Mail | |
| 8,857,506 B2 | 10/2014 | Stone, Jr. | |
| 8,899,940 B2 | 12/2014 | Laugemors | |
| 8,905,056 B2 | 12/2014 | Kendrick | |
| 8,905,138 B2 | 12/2014 | Lundstedt et al. | |
| 8,997,904 B2 * | 4/2015 | Cryer | B60W 10/30 180/53.1 |
| 9,018,881 B2 | 4/2015 | Mao et al. | |
| 9,051,822 B2 | 6/2015 | Ayan | |
| 9,067,182 B2 | 6/2015 | Nichols | |
| 9,103,193 B2 | 8/2015 | Coli | |
| 9,121,257 B2 | 9/2015 | Coli et al. | |
| 9,140,110 B2 | 9/2015 | Coli et al. | |
| 9,160,168 B2 | 10/2015 | Chapel | |
| 9,175,554 B1 | 11/2015 | Watson | |
| 9,206,684 B2 | 12/2015 | Parra | |
| 9,322,239 B2 | 4/2016 | Angeles Boza et al. | |
| 9,366,114 B2 | 6/2016 | Coli et al. | |
| 9,410,410 B2 * | 8/2016 | Broussard | E21B 43/26 |
| 9,450,385 B2 | 9/2016 | Kristensen | |
| 9,458,687 B2 | 10/2016 | Hallundbaek | |
| 9,475,020 B2 | 10/2016 | Coli et al. | |
| 9,475,021 B2 | 10/2016 | Coli et al. | |
| 9,534,473 B2 | 1/2017 | Morris et al. | |
| 9,562,420 B2 | 2/2017 | Morris et al. | |
| 9,587,649 B2 | 3/2017 | Oehring | |
| 9,611,728 B2 | 4/2017 | Oehring | |
| 9,650,879 B2 | 5/2017 | Broussard et al. | |
| 9,738,461 B2 | 8/2017 | DeGaray | |
| 9,745,840 B2 | 8/2017 | Oehring et al. | |
| 9,863,228 B2 | 1/2018 | Shampine et al. | |
| 10,008,880 B2 | 6/2018 | Vicknair | |
| 2002/0169523 A1 | 11/2002 | Ross | |
| 2003/0056514 A1 | 3/2003 | Lohn | |
| 2003/0138327 A1 | 7/2003 | Jones et al. | |
| 2004/0040746 A1 | 3/2004 | Niedermayr | |
| 2004/0102109 A1 | 5/2004 | Cratty | |
| 2004/0167738 A1 | 8/2004 | Miller | |
| 2005/0116541 A1 | 6/2005 | Seiver | |
| 2005/0274508 A1 | 12/2005 | Folk | |
| 2006/0052903 A1 | 3/2006 | Bassett | |
| 2006/0260331 A1 | 11/2006 | Andreychuk | |
| 2007/0131410 A1 | 6/2007 | Hill | |
| 2007/0187163 A1 | 8/2007 | Cone | |
| 2007/0201305 A1 | 8/2007 | Heilman et al. | |
| 2007/0226089 A1 | 9/2007 | DeGaray et al. | |
| 2007/0277982 A1 | 12/2007 | Shampine | |
| 2007/0278140 A1 | 12/2007 | Mallet et al. | |
| 2008/0112802 A1 | 5/2008 | Orlando | |

(56) References Cited

U.S. PATENT DOCUMENTS

| | | |
|---|---|---|
| 2008/0137266 A1 | 6/2008 | Jensen |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2009/0045782 A1* | 2/2009 | Datta .............. H02M 7/487 322/17 |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0085541 A1 | 4/2012 | Love et al. |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0232728 A1 | 9/2012 | Karimi |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0246211 A1 | 9/2014 | Guidry |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine et al. |
| 2015/0027712 A1 | 1/2015 | Vicknair |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1* | 4/2015 | Lamascus .............. H02P 27/04 318/490 |
| 2015/0114652 A1 | 4/2015 | Lestz |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0314225 A1 | 11/2015 | Coli et al. |
| 2015/0330172 A1 | 11/2015 | Allmaras |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0273328 A1 | 9/2016 | Oehring |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0037717 A1 | 2/2017 | Oehring |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0159570 A1 | 6/2017 | Bickert |
| 2017/0218843 A1 | 8/2017 | Oehring et al. |
| 2017/0222409 A1 | 8/2017 | Oehring et al. |
| 2017/0226842 A1 | 8/2017 | Omont et al. |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0328179 A1 | 11/2017 | Dykstra |
| 2017/0369258 A1 | 12/2017 | DeGaray |
| 2018/0038216 A1 | 2/2018 | Zhang |
| 2018/0320483 A1 | 11/2018 | Zhang |
| 2019/0003329 A1 | 1/2019 | Morris |
| 2019/0063309 A1 | 2/2019 | Davis |
| 2019/0162061 A1 | 5/2019 | Stephenson |
| 2019/0169971 A1 | 6/2019 | Oehring |
| 2019/0178235 A1 | 6/2019 | Coskrey |
| 2019/0211661 A1 | 7/2019 | Reckels |
| 2019/0245348 A1 | 8/2019 | Hinderliter |

FOREIGN PATENT DOCUMENTS

| | | |
|---|---|---|
| CA | 2966672 | 10/2012 |
| CA | 2833711 | 5/2014 |

(56) References Cited

FOREIGN PATENT DOCUMENTS

| | | |
|---|---|---|
| CA | 2964593 | 10/2017 |
| CN | 201687513 | 12/2010 |
| CN | 101977016 | 2/2011 |
| CN | 202023547 | 11/2011 |
| CN | 102602322 | 7/2012 |
| JP | 2004264589 | 9/2004 |
| WO | 2016/144939 | 9/2016 |
| WO | 2016/160458 | 10/2016 |

OTHER PUBLICATIONS

Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in Corresponding U.S. Appl. No. 15/145,491 dated May 15, 2017.
Non-Final Office Action dated Oct. 6, 2017 in related U.S. Appl. No. 14/881,535.
Non-Final Office Action dated Nov. 29, 2017 in related U.S. Appl. No. 15/145,414.
Non-Final Office Action dated Nov. 13, 2017 in related U.S. Appl. No. 15/644,487.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
UK Power Networks—Transformers to Supply Heat to Tate Modern—from Press Releases May 16, 2013.
Canadian Office Action dated Mar. 2, 2018 in related Canadian Patent Application No. 2,833,711.
Office Action dated Apr. 10, 2018 in related U.S. Appl. No. 15/294,349.
Office Action dated May 29, 2018 in related U.S. Appl. No. 15/235,716.
Canadian Office Action dated Apr. 18, 2018 in related Canadian Patent Application No. 2,928,711.
Canadian Office Action dated Jun. 22, 2018 in related Canadian Patent Application No. 2,886,697.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Office Action dated Jul. 25, 2018 in related U.S. Appl. No. 15/644,487.
Non-Final Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.

* cited by examiner

MODULAR REMOTE POWER GENERATION AND TRANSMISSION FOR HYDRAULIC FRACTURING SYSTEM

CROSS REFERENCE TO RELATED APPLICATIONS

This application is a continuation of, and claims priority to and the benefit of, U.S. Provisional Application Ser. No. 62/180,140, filed Jun. 16, 2015 and is a continuation-in-part of, and claims priority to and the benefit of U.S. patent application Ser. No. 13/679,689, filed Nov. 16, 2012, and now issued as U.S. Pat. No. 9,410,410, the full disclosures of which are hereby incorporated by reference herein for all purposes.

BACKGROUND OF THE INVENTION

1. Field of Invention

The present disclosure relates to hydraulic fracturing of subterranean formations. In particular, the present disclosure relates to a method and device for remotely generating and transmitting power for hydraulic fracturing of a subterranean formation.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore. Sometimes, nitrogen, carbon dioxide, foam, diesel, or other fluids are used as the primary component instead of water. A typical hydraulic fracturing fleet may include a data van unit, blender unit, hydration unit, chemical additive unit, hydraulic fracturing pump unit, sand equipment, wireline, and other equipment.

Traditionally, the fracturing fluid slurry has been pressurized on surface by high pressure pumps powered by diesel engines. To produce the pressures required for hydraulic fracturing, the pumps and associated engines have substantial volume and mass. Heavy duty trailers, skids, or trucks are required for transporting the large and heavy pumps and engines to sites where wellbores are being fractured. Each hydraulic fracturing pump usually includes power and fluid ends, seats, valves, springs, and keepers internally. These parts allow the pump to draw in low pressure fluid (approximately 100 psi) and discharge the same fluid at high pressures (up to 15,000 psi or more). The diesel engines and transmission which power hydraulic fracturing units typically generate large amounts of vibrations of both high and low frequencies. These vibrations are generated by the diesel engine, the transmission, the hydraulic fracturing pump as well as the large cooling fan and radiator needed to cool the engine and transmission. Low frequency vibrations and harshness are greatly increased by the large cooling fans and radiator required to cool the diesel engine and transmission. In addition, the diesel engine and transmission are coupled to the hydraulic fracturing pump through a u-joint drive shaft, which requires a three degree offset from the horizontal output of the transmission to the horizontal input of the hydraulic fracturing pump. Diesel powered hydraulic fracturing units are known to jack and jump while operating in the field from the large amounts of vibrations. The vibrations may contribute to fatigue failures of many differed parts of a hydraulic fracturing unit. Recently electrical motors have been introduced to replace the diesel motors, which greatly reduces the noise generated by the equipment during operation. Because of the high pressures generated by the pumps, and that the pumps used for pressurizing the fracturing fluid are reciprocating pumps, a significant amount of vibration is created when pressurizing the fracturing fluid. The vibration transmits to the piping that carries the fracturing fluid and its associated equipment, thereby increasing probabilities of mechanical failure for the piping and equipment, and also shortening their useful operational time.

SUMMARY OF THE INVENTION

Disclosed herein is an example of a hydraulic fracturing system for fracturing a subterranean formation which includes an electric motor, a pump coupled to the motor, and that has a discharge in fluid communication with a wellbore that intersects the formation, so that when the motor is activated and drives the pump, pressurized fluid from the pump pressurizes the wellbore to fracture the formation, a variable frequency drive in communication with the electric motor, and that controls the speed of the motor, and performs electric motor diagnostics to prevent damage to the electric motor, a source of electricity that is disposed a long distance from the electric motor, and transmission lines that connect the source of electricity to the electric motor and that span the long distance between the source of electricity and the electric motor. The system can further include a transformer between the transmission line and the source of electricity as well as a transformer between the transmission line and the electric motor. The source of electricity can be a utility outlet, a turbine generator, or a generator powered by any other source. An electric equipment room can be included that is in communication with the turbine generator and which controls operation of the turbine generator. A switch gear can optionally be included between the transmission line and the source of electricity, and another switch gear can be included between the transmission line and the electric motor. In this example, a transformer can be disposed between the switch gear and the electric motor. The electric motor can be a first electric motor, in this embodiment the system further includes a multiplicity of electric motors disposed at different locations, and wherein the transmission lines are selectively moveable at different times to provide electrical communication between the source of electricity and the multiplicity of motors.

Another example of a hydraulic fracturing system for fracturing a subterranean formation disclosed herein is made up of a power generation section, an equipment load section that is a long distance from the power generation section, and which has an electric motor and a pump driven by the electric motor and that has a fluid discharge in communication with a wellbore that intersects the formation. The system also includes a power transmission section that extends between the power generation section and the equipment load section, and through which the power generation section and equipment load section are in electrical communication. The system can include a variable frequency drive in communication with the electric motor, and that controls the speed of the motor, and performs electric motor diagnostics to prevent damage to the electric motor.

Lines can be included that provide electrical communication from the transmission section to electrically powered equipment disposed in the equipment load section, and wherein the lines make up a micro grid. The power generation section can include a turbine that is powered by natural gas and that is coupled to a generator. In an alternative, the transmission section has a set of transmission lines, wherein electricity at different phases is transmitted along different lines in the set of lines. Optionally, a one of the lines is a neutral line.

Also described herein is a method of fracturing a subterranean formation and which includes driving a pump with an electrical motor, transmitting electricity to the electrical motor from a power source that is a long distance from the electrical motor, pressurizing a fluid with the pump to form a pressurized fluid, and fracturing the subterranean formation by directing the pressurized fluid to a wellbore that intersects the subterranean formation. The method can also include controlling a speed of the motor with a variable frequency drive, as well as performing diagnostics on the electric motor. In one example, a voltage of the electricity proximate the power source is increased with a transformer, and the voltage of the electricity is decreased proximate the electric motor. Optionally, electrical communication can be suspended between the power source and the electrical motor with one of a cutout or a switch gear. In an embodiment, the electrical motor is a first electrical motor, the pump is a first pump, the wellbore is a first wellbore, and the subterranean formation is a first subterranean formation; in this example transmitting electricity to the electrical motor includes transmitting electricity across a transmission section that has an end in electrical communication with the power source, and another end that is in electrical communication with the first electrical motor, here the method also includes disconnecting the end of the transmission section that is in communication with the first electrical motor and reconnecting that end to a second electrical motor is a long distance from the power supply and that is connected to a second pump, and pressurizing fluid with the second pump and directing the pressurized fluid to a second wellbore for fracturing a second subterranean formation. The power source can be a power generation section that includes devices such as a utility outlet, a turbine generator, and an electrical equipment room.

BRIEF DESCRIPTION OF DRAWINGS

Some of the features and benefits of the present invention having been stated, others will become apparent as the description proceeds when taken in conjunction with the accompanying drawings, in which.

Figure 1:
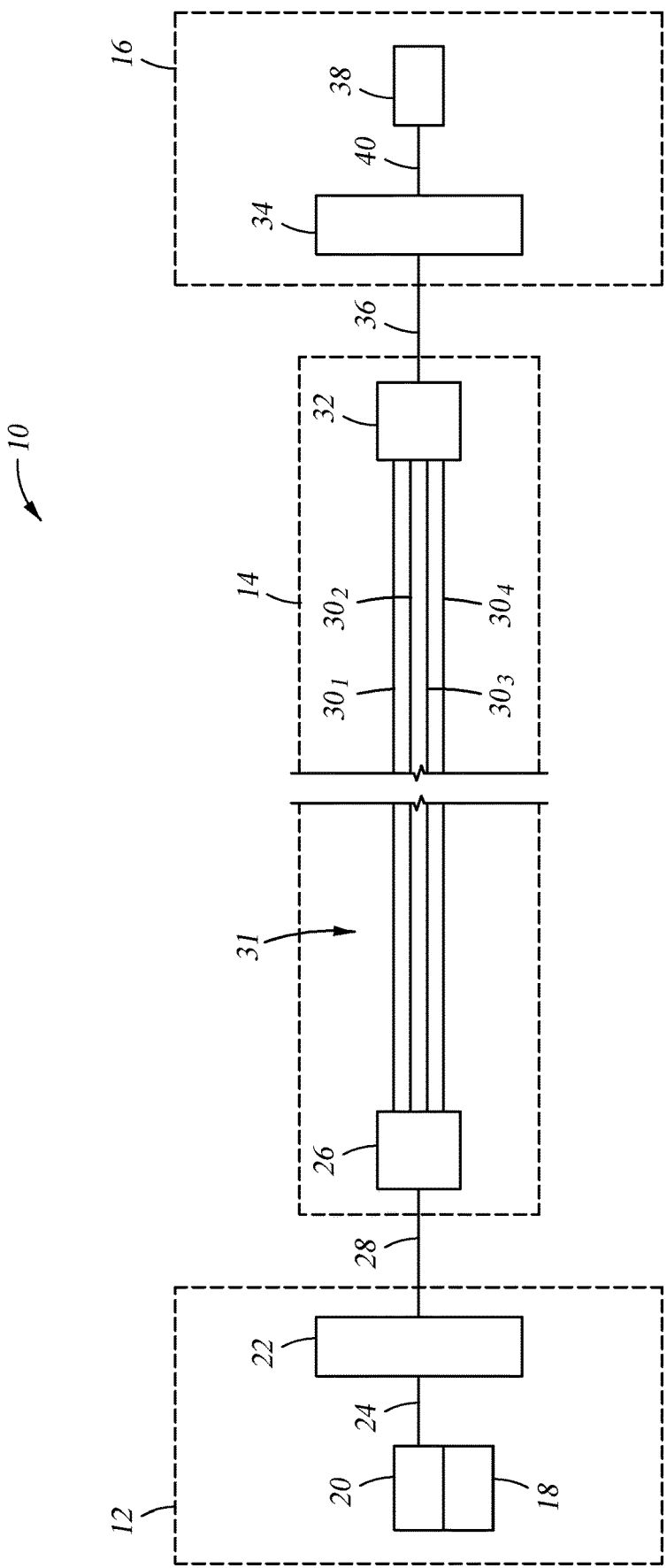
FIG. 1 is a schematic of an example of a hydraulic fracturing system having power generation, power transmission, and power load sections.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is a schematic example of a hydraulic fracturing system 10, and which includes a power generation section 12, a transmission section 14, and an equipment load section 16. A electricity source 18 shown in the power generation section 12 for providing electricity to the equipment load section 16. Examples of the electricity source 18 include a utility outlet or a generator; which is used to generate electricity, and in one embodiment the generator converts mechanical energy into electrical energy which is transmitted across the transmission section 14 to power devices in the equipment load section 16. Other embodiments of the electricity source 18 include a turbine generator as well as a diesel powered motor coupled with a generator. An electrical equipment room ("EER") 20 is shown disposed adjacent the electricity source 18, and which controls operation of the electricity source 18 when the electricity source 18 is a turbine generator. Examples of controlling operation of the electricity source 18 include monitoring operational parameters of the turbine generator; such as its operating conditions (i.e. rpm and temperature), its electrical output, electrical phase angles, and its energy input, and adjusting operations of the turbine generator based on the monitored conditions; as well as start-up and shut-down of the turbine generator. A switch gear 22 is illustrated in electrical communication with an output of the EER 20 via a line 24. Switch gear 22 provides electrical isolation between the electrical output of electricity source 18 and transmission section 14.

An output of switch gear 22 connects to a cutout 26 via a line 28. Cutout 26 is disposed within the transmission section 14 of the fracturing system 10, and is selectively opened to electrically isolate power generation section 12 from transmission section 14. An output end of cutout 26 connects to transmission lines $30_{1-4}$, where transmission lines $30_{1-4}$ define an example of a transmission line set 31. Transmission lines $30_{1-4}$ transmit electricity from cutout 26 to another cutout 32, which is disposed proximate equipment load section 16. In one embodiment, one of the transmission lines $30_{1-4}$ is a ground or neutral, while the remaining transmission lines $30_{1-4}$ carry electricity that is at different phases. Transmission section 14 can be selectively isolated from equipment load section 16 by activating switching components in cutout 32. A switch gear 34 disposed in the equipment load section 16 electrically connects to cutout 32 via a line 36. Switch gear 34 provides electrical isolation between line 36 and equipment load 38. Equipment load 38, which connects to switch gear 34 through line 40, represents end users of electricity generated by electricity source 18, and which as described in more detail below, pressurizes fluid that is used to fracture a subterranean formation.

In the illustrated example, power generation system 12 is located distal from equipment load section 16, and the transmission section 14 and transmission lines $30_{1-4}$ necessarily span the distance between power generation system 12 and equipment load section 16. Example distances between power generation system 12 and equipment load section 16 include up to about one mile, up to about five miles, up to about 20 miles, up to about 50 miles, up to about 100 miles, up to about 300 miles, up to about all distances between the cited distances, and about one mile, five miles, 20 miles, 50 miles, 100 miles, 300 miles, and all distances there between. For the purposes of discussion herein, a long distance between a power generation system 12 and equipment load section 16 is at least one half of a mile. Advantages of a transmission section 14 that extends long distances, include that the fracturing system 10 disclosed herein can operate at a designated operation performance and overcome physical conditions that are present at a fracturing site. Such physical conditions include insufficient available space proximate a well site that is being fractured to accommodate both the equipment load section 16 and power generation section 12. Other restrictions may prevent the power generation system 12 from being situated with or proximate to the equipment load section 16, such as noise and emissions restrictions local to an area being fractured (i.e. wildlife preserves, residential neighborhoods, airports). Thus the power generation section 12 can be set a long distance from the equipment load section 16, and yet still provide ample electricity to operate the equipment load section 16 to a designated performance level. Alternatively, the power generation section 12 can be selectively connected to, and power, multiple different equipment load sections 16 that are disposed distal from the power generation section 12.

Figures 2, 3:
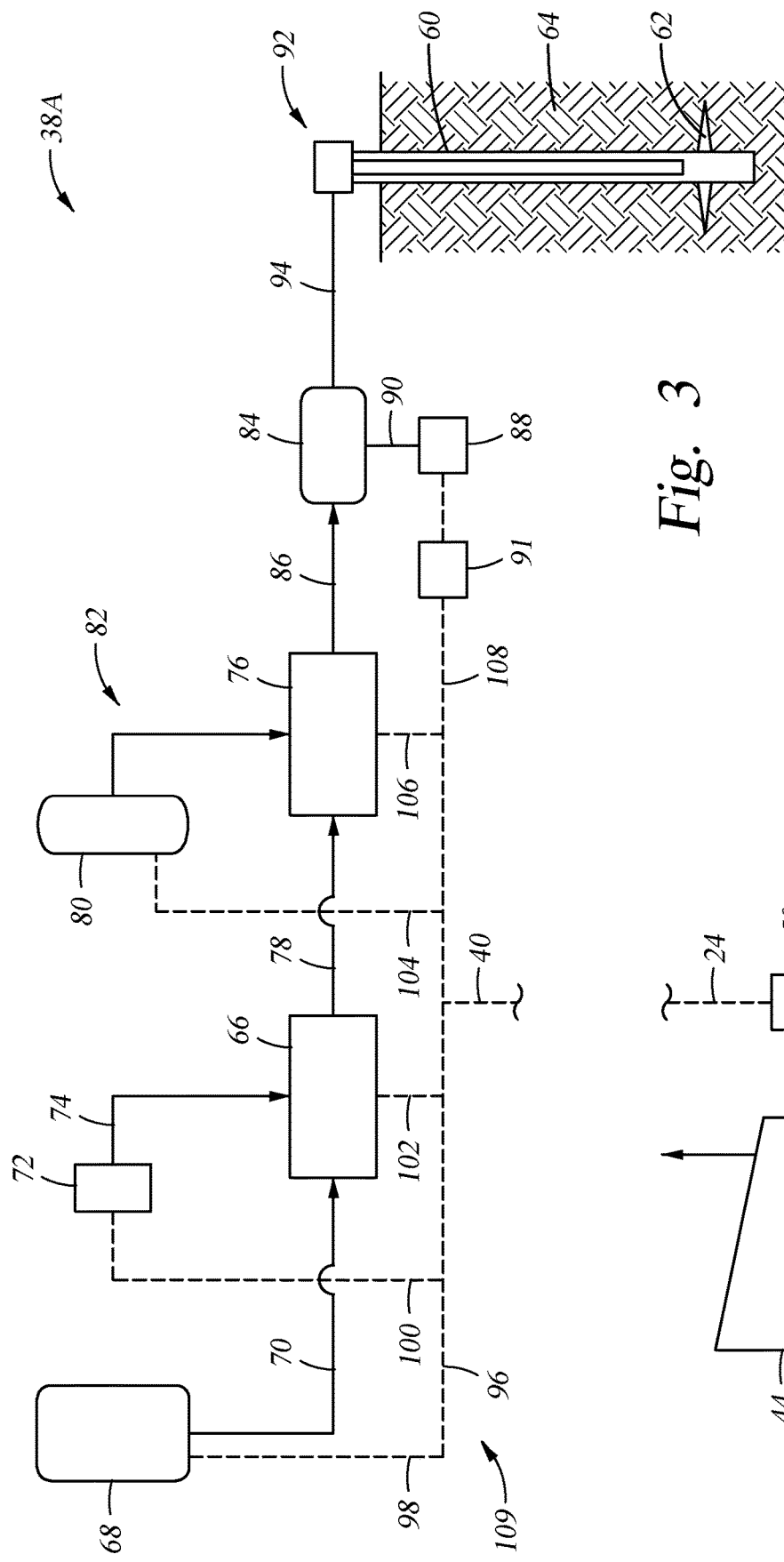
FIG. 2 is a schematic of an example of a power generation section for use in the hydraulic fracturing system of FIG. 1.
FIG. 3 is a schematic of an example of a power load section for use in the hydraulic fracturing system of FIG. 1.

Referring now to FIG. 2, an example of a turbine 44 is schematically illustrated, and which receives a combustible fuel from a fuel source 46 via a feed line 48. In one example, the combustible fuel is natural gas, and the fuel source 46 can be a container of natural gas or a well (not shown) proximate the turbine 44. Combustion of the fuel in the turbine 44 in turn powers a generator 50 that produces electricity. Shaft 52 connects generator 50 to turbine 44. Optionally, other types of couplings, such as gearing, can be used to connecting generator 50 to turbine 44. The combination of the turbine 44, generator 50, line 24, and shaft 52 define one example of electricity source 18.

Shown in schematic form in FIG. 3 is one example of the equipment load 38A of the hydraulic fracturing system 10 (FIG. 1), and that is used for pressurizing a wellbore 60 to create fractures 62 in a subterranean formation 64 that surrounds the wellbore 60. Included with the equipment load 38A is a hydration unit 66 that receives fluid from a fluid source 68 via line 70, and also selectively receives additives from an additive source 72 via line 74. Additive source 72 can be separate from the hydration unit 66 as a stand-alone unit, or can be included as part of the same unit as the hydration unit 66. The fluid, which in one example is water, is mixed inside of the hydration unit 66 with the additives. In an embodiment, the fluid and additives are mixed over a period of time to allow for uniform distribution of the additives within the fluid. In the example of FIG. 2, the fluid and additive mixture is transferred to a blender 76 via line 78. A proppant source 80 contains proppant, which is delivered to the blender 76 as represented by line 82, where in one example, line 82 is a conveyer. Inside the blender 76, the proppant and fluid/additive mixture are combined to form a fracturing slurry, which is then transferred to a fracturing pump 84 via line 86; thus fluid in line 86 includes the discharge of blender unit 76 which is the suction (or boost) for the fracturing pump system 84. Blender 76 can have an onboard chemical additive system, such as with chemical pumps and augers. Optionally, additive source 72 can provide chemicals to blender 76; or a separate and standalone chemical additive system (not shown) can be provided for delivering chemicals to the blender 76. In an example, the pressure of the slurry in line 86 ranges from around 80 psi to around 100 psi. The pressure of the slurry in line 94 can be increased up to around 15,000 psi by pump 84. A motor 88, which connects to pump 84 via connection 90, drives pump 84 so that it can pressurize the slurry. In one example, the connection 90 is a direct coupling between an electric motor 88 and a hydraulic fracturing pump 84. In another example, the connection 90 is more than one direct coupling, but includes one on each end of the motor and two hydraulic fracturing pumps (not shown).

In an alternative, each hydraulic fracturing pump 84 is decoupled independently from the main electric motor 88. In one example, the motor 88 is controlled by a variable frequency drive ("VFD") 91. After being discharged from pump 84, slurry is injected into a wellhead assembly 92; discharge piping 94 connects discharge of pump 84 with wellhead assembly 92 and provides a conduit for the slurry between the pump 84 and the wellhead assembly 92. In an alternative, hoses or other connections can be used to provide a conduit for the slurry between the pump 84 and the wellhead assembly 92. Optionally, any type of fluid can be pressurized by the fracturing pump 84 to form a fracturing fluid that is then pumped into the wellbore 60 for fracturing the formation 64, and is not limited to fluids having chemicals or proppant. Examples also exist wherein the system 38A includes the ability to pump down equipment, instrumentation, or other retrievable items through the slurry into the wellbore.

Still referring to FIG. 3, an end of line 40 opposite from switch gear 34 (FIG. 1) is shown connecting to and in electrical communication with a power bus 96. Lines 98, 100, 102, 104, 106, and 108 are depicted connected to power bus 96, and which transmit electricity to electrically powered end users in the equipment load 38. More specifically, line 98 connects fluid source 68 to bus 96, line 100 connects additive source 72 to bus 96, line 102 connects hydration unit 66 to bus 96, line 104 connects proppant source 80 to bus 96, line 106 connects blender 76 to bus 96, and line 108 connects motor 88 to bus 96. In an embodiment, lines 24, 40, 98, 100, 102, 104, 106, 108, power bus 96, and transmission section 14 define a micro grid 109. In an example, additive source 72 contains ten or more chemical pumps for supplementing the existing chemical pumps on the hydration unit 66 and blender 76. Chemicals from the additive source 72 can be delivered via lines 74 to either the hydration unit 66 and/or the blender 76.

Figure 4:
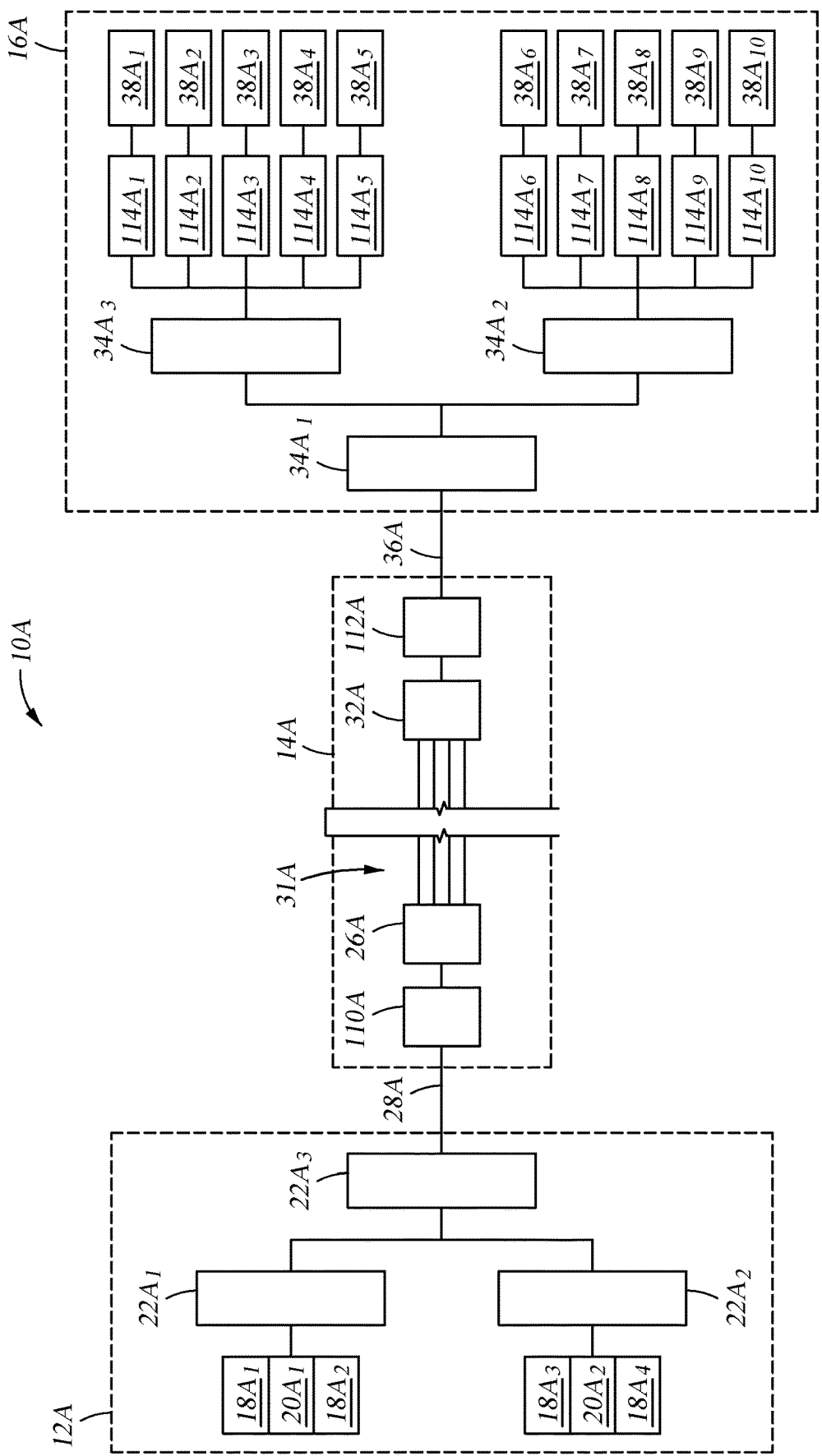
FIG. 4 is a schematic of an alternate example of the hydraulic fracturing system of FIG. 1.

Depicted schematically in FIG. 4 is an alternate example of a fracturing system 10A having a power generation section 12A that includes multiple turbine generators $18A_{1-4}$, and multiple EERs $20A_{1,2}$. In this example EER $20A_1$ is associated with and controls turbine generators $18A_{1,2}$; and EER $20A_2$ is associated with and controls turbine generators $18A_{3,4}$. Alternatively, an EER could be provided for each turbine generator so that every turbine generator has a dedicated EER. Electricity generated by turbine generators $18A_{1,2}$ is transmitted to switch gear $22A_1$, and electricity generated by turbine generators $18A_{3,4}$ is transmitted to switch gear $22A_2$. Output from switch gears $22A_{1,2}$ is transmitted to switch gear $22A_3$, where switch gear $22A_{1-3}$ are all disposed within power generation section 12A. In the example of FIG. 4, transmission section 31A, including a transformer 110A and cutout 26A, is shown between power generation section 12A and transmission section 14A, which can include transformer 112A and cutout 32A. Transformer 110A can be connected to an output of switch gear $22A_3$ by line 28A. In an example, transformer 110A is a step up transformer that increases voltage of the electricity being supplied by the power generation section 12A and to reduce electrical losses across the long distances of the transmission section 14A. Example voltages of the electricity being generated by electricity source 18, $18A_{1-4}$ range from around 4,160 V to around 13,800 V. In one embodiment, transformer 110A steps up the voltage of the electricity up to around 50,000 V, which includes any value between 50,000 V and the voltage of the electricity received by transformer 110A. A transformer 112A is shown disposed at an end of transmission section 14A and proximate to equipment load section 16A. In one embodiment, transformer 112A is a step down transformer and reduces the voltage of the electricity being transmitted across transmission section 14A. Examples exist where the transformer 112A reduces voltage of the electricity to around 13,800 V, 4160 V, to around 600 V, to around 480 V, other voltages, or to voltages as needed by equipment in the equipment load section 16A.

Still referring to FIG. 4, switch gear $34A_1$ in the equipment load section 16A receives, via line 36A, electricity conditioned by transformer 112A. Electricity from switch gear $34A_1$ flows to switch gear $34A_2$ and in parallel to switch gear $34A_3$. Electricity from switch gear $34A_2$ feeds equipment loads $38A_{1-5}$, and electricity from switch gear $34A_3$ feeds equipment loads $38A_{6-10}$, where equipment loads $38A_{1-10}$, can be the same or similar equipment illustrated in FIG. 3 used for pressurizing hydraulic fluid and that are electrically powered. Optional transformers $114A_{1-10}$ are shown that step down voltages of electricity being delivered respectively to equipment loads $38A_{1-10}$. For the sake of brevity not all combinations of the fracturing system 10 are illustrated in the accompanying figures, but many more combinations do exist and are considered within the scope of the present disclosure. In alternate examples, the number of turbine generators 18 can range from one to six or more and any number between, the number of EERs 20 can range from one to six or more, and any number between, the transmission line sets 31 can range from one to six or more, and any number between. Further optionally, the number of switch gear in the power generation section 12 and in the equipment load section 16 can range from zero to four or more, and any number between. Also, when more than one switch gear is disposed in a one of the sections 12, 16, different tie in arrangements are possible. For example, each switch gear can directly connect to equipment in the particular section 12, 16 and be in parallel, or can connect to one another in series. Additionally, examples exist where cutouts 26, 32 are provided at opposing ends of a transmission section 14.

Figure 5:
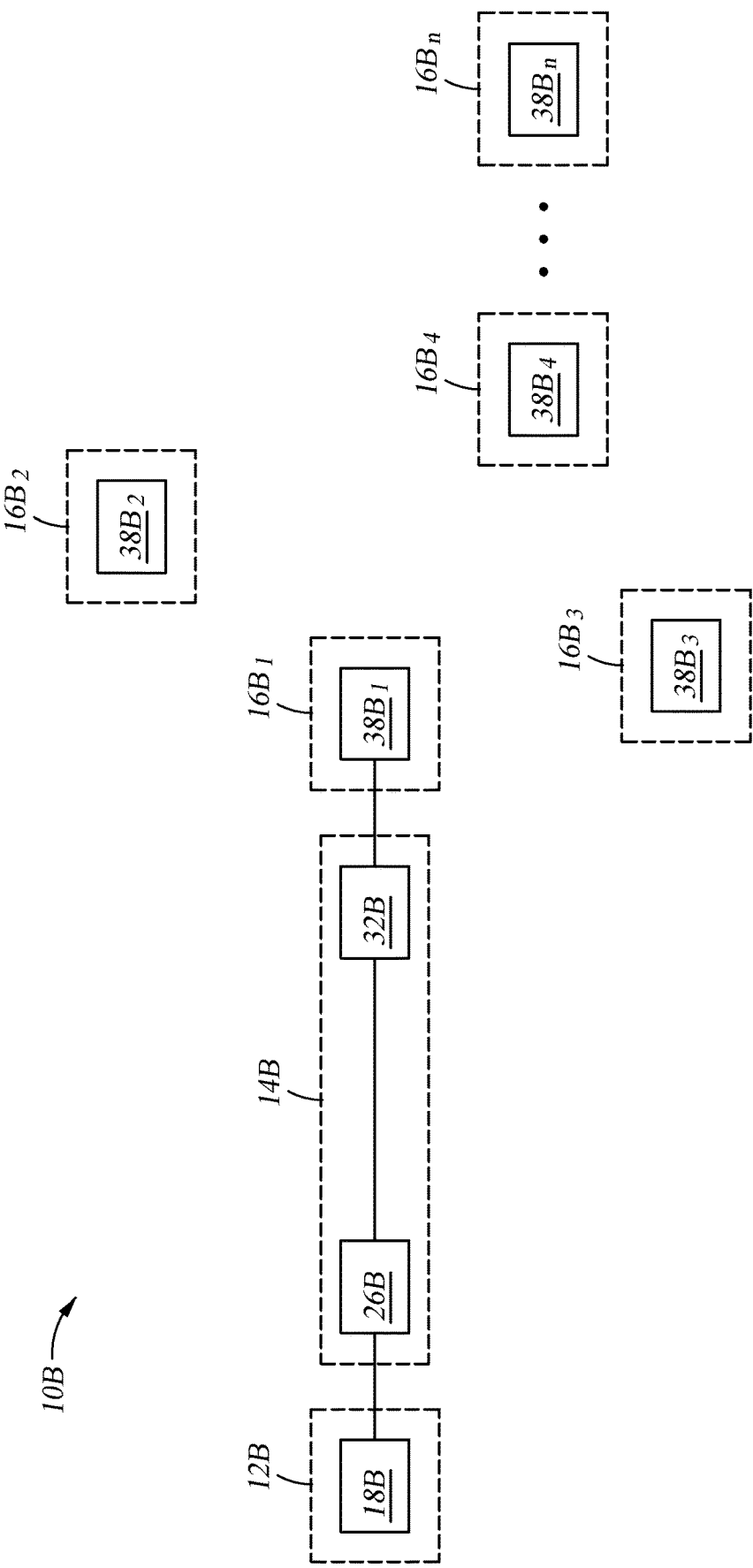
FIG. 5 is a schematic of an alternate example of the hydraulic fracturing system of FIG. 1 having multiple equipment load sections.

Provided in schematic form in FIG. 5 is an example of a hydraulic fracturing system 10B having multiple equipment load sections $16B_{1-n}$. In this example, power generation section 12B is distal from each of the equipment load sections $16B_{1-n}$ by at least a long distance. As illustrated, transmission section 14B provides electrical communication between power generation section 12B and equipment load section $16B_1$. However, the transmission section 14B is readily moveable, so that power from power generation section 12B via transmission section 14B can be readily switched from equipment load section $16B_1$ to another one of the equipment load sections $16B_{2-n}$. The switching process can be repeated until all equipment load sections $16B_{1-n}$ are in electrical communication with and powered by power generation section 12B. An example of switching communication to another one of the equipment load sections $16B_{1-n}$ can be when fracturing operations are completed or ceased at a one of the equipment load sections $16B_{1-n}$. Although all sections of all embodiments of the hydraulic fracturing system 10 are readily mobile, in some applications an advantage exists by reconfiguring/moving the transmission section 14B rather than the power generation system 12B when providing electrical power to the equipment load sections $16B_{1-n}$ that are disposed at different locations.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

That claimed is:

1. A hydraulic fracturing system for fracturing a subterranean formation comprising:
   an electric motor;
   a pump coupled to the motor, and that has a discharge in fluid communication with a wellbore that intersects the formation, so that when the motor is activated and drives the pump, pressurized fluid from the pump pressurizes the wellbore to fracture the formation;
   a variable frequency drive in communication with the electric motor, and that controls the speed of the motor, and performs electric motor diagnostics to prevent damage to the electric motor;
   a source of electricity that is disposed a long distance from the electric motor
   transmission lines that connect the source of electricity to the electric motor and that span the long distance between the source of electricity and the electric motor; and
   a switch gear between the transmission line and the source of electricity, and another switch gear between the transmission line and the electric motor.

2. The hydraulic fracturing system of claim 1, further comprising a transformer between the transmission line and the source of electricity.

3. The hydraulic fracturing system of claim 1, further comprising a transformer between the transmission line and the electric motor.

4. The hydraulic fracturing system of claim 1, wherein the source of electricity is selected from the group consisting of a utility outlet, a turbine generator, and a reciprocating engine generator.

5. The hydraulic fracturing system of claim 4, further comprising an electric equipment room in communication with the turbine generator and which controls operation of the turbine generator.

6. The hydraulic fracturing system of claim 1, further comprising a transformer between the switch gear and the electric motor.

7. The hydraulic fracturing system of claim 1, wherein the electric motor comprises a first electric motor, the system further comprising a multiplicity of electric motors, and wherein the transmission lines are selectively moveable at different times to provide electrical communication between the source of electricity and the multiplicity of motors.

8. A method of fracturing a subterranean formation comprising:
   driving a pump with an electric motor;
   transmitting electricity via a transmission line to the electric motor from a power source that is a long distance from the electric motor, wherein a first switchgear is positioned between the power source and the transmission line and a second switchgear is positioned between the transmission line and the electric motor;
   pressurizing a fluid with the pump to form a pressurized fluid; and
   fracturing the subterranean formation by directing the pressurized fluid to a wellbore that intersects the subterranean formation.

9. The method of claim 8, further comprising controlling a speed of the motor with a variable frequency drive.

10. The method of claim 9, further comprising performing diagnostics on the electric motor with the variable frequency drive.

11. The method of claim 8, further comprising increasing a voltage of the electricity proximate the power source with a transformer, and decreasing the voltage of the electricity proximate the electric motor.

12. The method of claim 8, further comprising suspending electrical communication between the power source and the electric motor with one of a cutout or a switch gear.

13. The method of claim 8, wherein the electric motor comprises a first electric motor, the pump comprises a first pump, the wellbore comprises a first wellbore, and the subterranean formation comprises a first subterranean formation, and wherein the step of transmitting electricity to the electric motor comprises transmitting electricity across a transmission section that has an end in electrical communication with the power source, and another end that is in electrical communication with the first electric motor, the method further comprising,
   disconnecting the end of the transmission section that is in communication with the first electric motor and reconnecting that end to a second electric motor is a long distance from the power supply and that is connected to a second pump, and
   pressurizing fluid with the second pump and directing the pressurized fluid to a second wellbore for fracturing a second subterranean formation.

14. The method of claim 8, wherein the power source comprises a power generation section that includes devices selected from the group consisting of a utility outlet, a turbine generator, and an electrical equipment room.

* * * * *

(12) INTER PARTES REVIEW CERTIFICATE (3998th)
United States Patent
Hinderliter et al.

(10) Number: US 10,526,882 K1
(45) Certificate Issued: Jun. 27, 2025

(54) MODULAR REMOTE POWER GENERATION AND TRANSMISSION FOR HYDRAULIC FRACTURING SYSTEM

(71) Applicants: Brandon Neil Hinderliter; Jared Oehring

(72) Inventors: Brandon Neil Hinderliter; Jared Oehring

(73) Assignee: U.S. WELL SERVICES, LLC

Trial Number:
IPR2021-01238 filed Jul. 28, 2021

Inter Partes Review Certificate for:
Patent No.: 10,526,882
Issued: Jan. 7, 2020
Appl. No.: 15/183,387
Filed: Jun. 15, 2016

The results of IPR2021-01238 are reflected in this inter partes review certificate under 35 U.S.C. 318(b).

INTER PARTES REVIEW CERTIFICATE
U.S. Patent 10,526,882 K1
Trial No. IPR2021-01238
Certificate Issued Jun. 27, 2025

AS A RESULT OF THE INTER PARTES REVIEW PROCEEDING, IT HAS BEEN DETERMINED THAT:

Claims 1-14 are cancelled.

\* \* \* \* \*